United States Patent
Torres et al.

(10) Patent No.: US 8,906,220 B2
(45) Date of Patent: Dec. 9, 2014

(54) METHOD FOR PRODUCTION OF METALLIC COBALT FROM THE NICKEL SOLVENT EXTRACTION RAFFINATE

(76) Inventors: Vanessa Torres, Belo Horizinte (BR); Marcelo Augusto Castro Lopes da Costa, Belo Horizonte (BR); Omar Antunes Do Carmo, Belo Horizonte (BR); Salomão Solino Evelin, Belo Horizonte (BR)

( * ) Notice: Subject to any disclaimer, the term of this patent is extended or adjusted under 35 U.S.C. 154(b) by 1365 days.

(21) Appl. No.: 12/447,417

(22) PCT Filed: Oct. 19, 2007

(86) PCT No.: PCT/BR2007/000280
§ 371 (c)(1),
(2), (4) Date: Apr. 27, 2009

(87) PCT Pub. No.: WO2008/049177
PCT Pub. Date: May 2, 2008

(65) Prior Publication Data
US 2010/0089764 A1   Apr. 15, 2010

(30) Foreign Application Priority Data
Oct. 27, 2006 (BR) ..................................... 0604853

(51) Int. Cl.
C25C 1/08 (2006.01)
C22B 23/00 (2006.01)
C22B 3/00 (2006.01)
C22B 3/38 (2006.01)
C22B 15/00 (2006.01)

(52) U.S. Cl.
CPC ............... *C22B 23/0492* (2013.01); *C25C 1/08* (2013.01); *C22B 15/0093* (2013.01); *C22B 3/0068* (2013.01); *C22B 23/0461* (2013.01); *C22B 23/0469* (2013.01)
USPC ............ 205/590; 205/587; 423/139; 423/141

(58) Field of Classification Search
USPC ............................................................. 205/590
See application file for complete search history.

(56) References Cited

U.S. PATENT DOCUMENTS 3,673,062 A * 6/1972 Smith et al. ............... 205/589
3,716,618 A * 2/1973 Weir et al. .................. 423/143

(Continued)

OTHER PUBLICATIONS

International Search report regarding PCT/BR2007/000280, (May 8, 2008).

*Primary Examiner* — Bryan D. Ripa
(74) *Attorney, Agent, or Firm* — Husch Blackwell LLP

(57) ABSTRACT

Method for production of metallic cobalt from the raffinate from solvent extraction of nickel'. Said method comprises the following stages: (A) obtaining the raffinate from solvent extraction of nickel, for production of cobalt; (B) adding a sulfide precipitation agent to said raffinate, for cobalt sulfide and zinc sulfide precipitation; (C) removing all ammonia from the sulfidized pulp (solids and liquid); (D) subjecting the filtered solid—cobalt sulfide (and impurities)—to atmospheric leaching; (E) reducing to a minimum the zinc concentration in the cobalt round, by means of solvent extraction with D2EPHA extractant diluted in solvent, in any solvent extraction system comprising the required number of extraction, scrubbing, and stripping stages, with resident time of not less than 1 minute at each of the stages used; (F) performing nickel removal by ion exchange, for nickel purification; (G) adding sodium carbonate to the solution, for cobalt carbonate precipitation; (H) leaching the produced cobalt carbonate in a system that utilizes an acid, preferably sulfuric acid, and more preferably, the anolyte from cobalt electrolysis; (I) performing cobalt electrowinning so as to recover the cobalt from the solution in its metallic form; and (J) allowing the metallic cobalt to settle on insoluble stainless steel plates during the time required for production of the cobalt cathodes.

31 Claims, 1 Drawing Sheet

(56) References Cited

U.S. PATENT DOCUMENTS

| | | | |
|---|---|---|---|
| 3,821,354 A * | 6/1974 | Gandon et al. | 423/139 |
| 3,975,497 A | 8/1976 | Wiwiorowski et al. | |
| 3,975,507 A * | 8/1976 | Matson | 423/561.1 |
| 4,008,076 A * | 2/1977 | Junghanss et al. | 75/400 |
| 4,039,302 A * | 8/1977 | Khera | 518/712 |
| 4,042,665 A * | 8/1977 | Hatch | 423/139 |
| 4,073,860 A | 2/1978 | Huggins et al. | |
| 4,288,305 A * | 9/1981 | Garritsen et al. | 205/587 |
| 4,378,275 A * | 3/1983 | Adamson et al. | 205/605 |
| 4,401,630 A * | 8/1983 | Ettell et al. | 423/34 |
| 4,552,629 A * | 11/1985 | Duyvesteyn et al. | 205/101 |
| 5,316,683 A * | 5/1994 | Haesebroek et al. | 210/688 |
| 5,616,168 A * | 4/1997 | Gabb et al. | 75/718 |
| 5,961,938 A * | 10/1999 | Yamamoto | 423/21.1 |
| 6,458,184 B2 * | 10/2002 | Featherstone | 75/712 |
| 2001/0001650 A1 * | 5/2001 | Duyvesteyn et al. | 423/139 |
| 2003/0223928 A1 | 12/2003 | Freeman et al. | |
| 2005/0120828 A1 * | 6/2005 | Babjak et al. | 75/739 |
| 2006/0228279 A1 * | 10/2006 | Campbell et al. | 423/150.1 |
| 2008/0016986 A1 * | 1/2008 | Liu et al. | 75/407 |

* cited by examiner

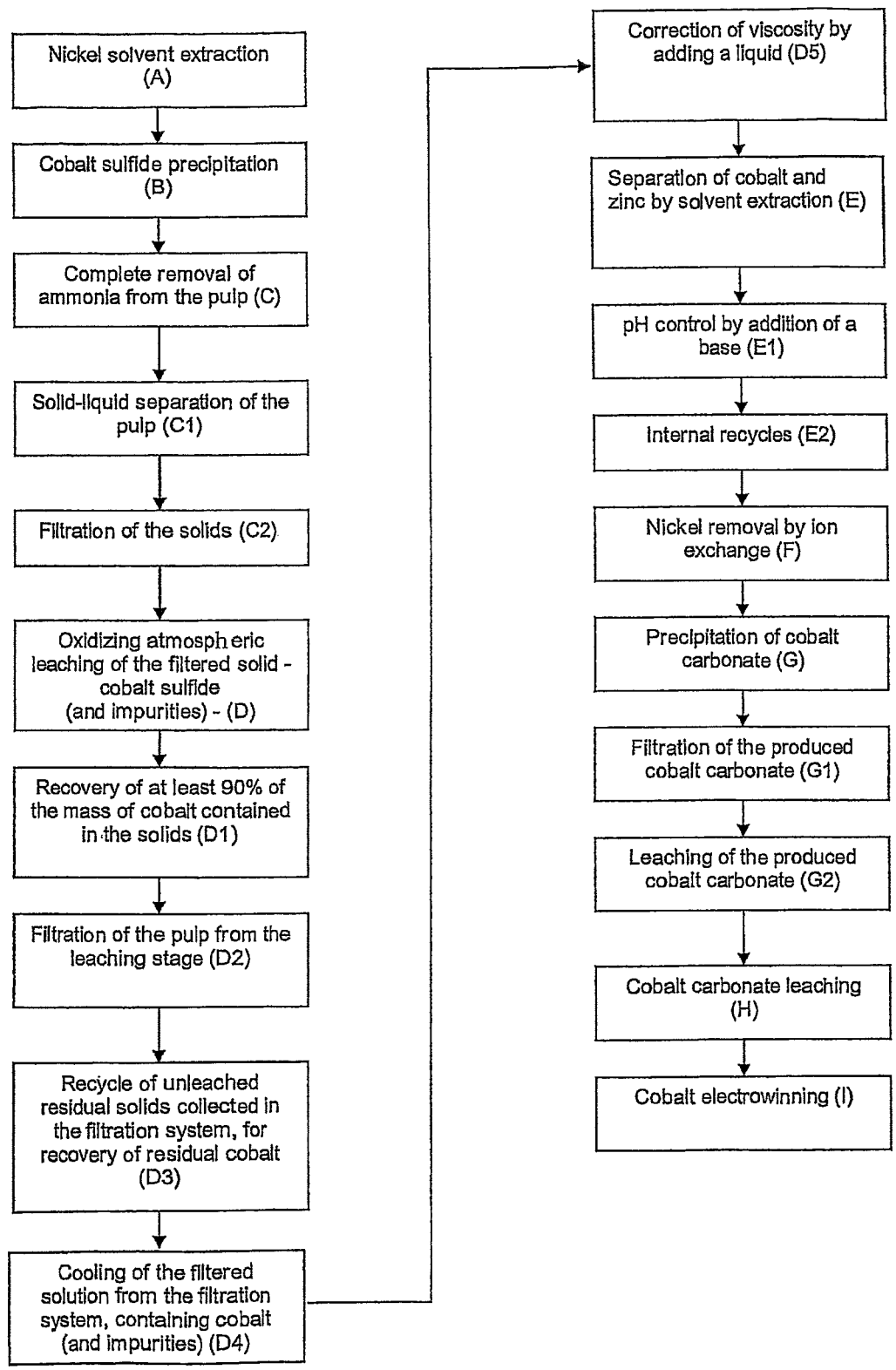

METHOD FOR PRODUCTION OF METALLIC COBALT FROM THE NICKEL SOLVENT EXTRACTION RAFFINATE

The present report relates to a method for production of metallic cobalt from the nickel solvent extraction raffinate, and more specifically, from the nickel solvent extraction raffinate from refineries where mixed hydroxides of nickel and cobalt are subjected to ammonia leaching.

As is known by the person skilled in the art, there have been developed techniques for cobalt recovery by direct precipitation of cobalt carbonate in a column for total removal (stripping) of ammonia from the solution. Said techniques, however, remain technically and economically unfeasible.

One of the disadvantages aforementioned is the fact that, without addition of reagent to the raffinate prior to ammonia stripping, only a small amount of cobalt precipitates from the solution, which renders the recovery technique low profitable.

A counterpart disadvantage arises from increasing the consumption of reagent for said refining process, which consequently increases cobalt recovery by said technique. The high consumption of reagent renders the process economically unfeasible.

Therefore, one of the objectives of the present invention is to provide a method for production of metallic cobalt from the nickel solvent extraction raffinate so that significant cobalt recovery efficiency is achieved without significant increase in costs.

One other objective of the present invention is to provide a method for production of metallic cobalt from the nickel solvent extraction raffinate comprising an operational sequence that is both technically and economically feasible.

As is known, according to conventional technique, there are four types of processes or routes for nickel-ore treatment, namely, nickel matte production (pyrometallurgical), ferronickel production (pyrometallurgical ammoniacal reduction-leaching (pyrometallurgical/hydrometallurgical), and pressure acid leaching (hydrometallurgical).

With regard to the routes aforementioned, the first is applicable to ores bearing nickel associated with sulfur, and in this process, use is made of the caloric power of the minerals present in the smelting stage.

The other three processes are used where the nickel metal is associated with oxygen (oxidized or lateritic ore), the choice of which process to use being dependent on the composition of the ore to be treated.

The ferronickel production process is used for high-grade magnesium ores with a Mg/Si ratio such that the gangue produced by the process has sufficient fluidity to flow out of the electric furnace and is not corrosive to the refractory lining materials of the electric furnace. Typically, the ores treated by this process contain iron grades lower than those of ores treated by the two processes hereinabove. On the other hand, nickel grades are higher.

As for the ammoniacal reduction-leaching process, a combination of pyrometallurgical and hydrometallurgical techniques is used to separate nickel and cobalt from the iron contained in the ores normally treated by this process. Notwithstanding its high selectivity in the ammoniacal leaching stage, this process requires higher energy consumption while concurrently achieving lower nickel and cobalt recoveries as compared with pressure acid leaching.

In the pressure acid leaching process, as in the case of ammoniacal reduction-leaching, the ores used have lower nickel contents and higher iron contents. In this process, practically all the minerals present are dissolved in acid solution, and consequently, nickel and cobalt recoveries are high. Selectivity to iron is also high, and occurs predominantly during the leaching stage.

Therefore, with respect to the pressure acid leaching process, a technique is proposed for obtaining the leached cobalt metal in its metallic form. After the leachate from the pressure acid leaching stage has been treated for removal of impurities that had been leached with the nickel and cobalt, these metals are precipitated from the solution as hydroxides, and this precipitate is leached with either ammonia or ammonium carbonate; the nickel and cobalt return to the liquid form, forming nickel and cobalt complexes with ammonia in solution.

This process has high selectivity over iron, manganese, and magnesium. Nickel and cobalt separation occurs in a solvent extraction stage, after cobalt has been oxidized to the trivalent state ($Co^{3+}$) so as to not be coextracted with nickel. In the extraction step of the solvent extraction stage, nickel is extracted from the stripped ammoniacal leach liquor with an organic extractant, and subsequently recovered in the metallic form by electrowinning, while cobalt remains in said liquor (raffinate).

The objective of the present invention is to recover the cobalt metal contained in the ammoniacal liquor—i.e. in the nickel solvent extraction raffinate—in its metallic form.

These objectives, as well as other objectives and advantages of the present invention, are attained with a method for production of metallic cobalt from the nickel solvent extraction raffinate, which comprises the following stages: (a) obtaining the nickel solvent extraction raffinate for production of cobalt; (B) adding a sulfide precipitation agent to said raffinate, for cobalt sulfide and zinc sulfide precipitation; (C) removing all ammonia from the sulfidized pulp (solids and liquid); (D) subjecting the filtered solid—cobalt sulfide (and impurities)—to atmospheric leaching; (E) reducing to a minimum the zinc concentration in the cobalt round, by means of solvent extraction with di(2-ethylhexyl) phosphoric acid extractant diluted in Escaid 110 solvent or equivalent solvent, in any solvent extraction system comprising the required number of extraction, scrubbing, and stripping stages, with resident time of not less than 1 minute at each of the stages used; (F) performing nickel removal by ion exchange, for nickel purification; (G) adding sodium carbonate to the solution, for cobalt carbonate precipitation; (H) leaching the produced cobalt carbonate in a system that utilizes an acid, preferably sulfuric acid, and more preferably, the anolyte from cobalt electrolysis; (I) performing cobalt electrowinning, so as to recover the cobalt from the solution in its metallic form; and (J) allowing the metallic cobalt to settle on insoluble stainless steel plates for the time required for the production of cobalt cathodes.

The present invention is described hereinunder in relation to the drawing annexed hereto, in which a single item represents a block diagram of the method for production of metallic cobalt from the nickel solvent extraction raffinate.

According to said drawing, the raffinate from the nickel solvent extraction stage (A) is utilized for the production of cobalt. A sulfide precipitation agent, preferably sodium hydrosulfide (NaHS), is added to this raffinate (B), using a stoichiometric amount of base for the cobalt and zinc contained in the solution and most preferably an excess of 1.5 times the stoichiometric dosage for the cobalt and zinc in the solution, for the precipitation of cobalt sulfide and zinc sulfide. The precipitation temperature must be maintained within the range 40° C. to 55° C. and most preferably at 45° C. After the precipitation of cobalt sulfide (and impurities), all the ammonia present in the sulfidized pulp (solids and liquid) is removed (C), preferably by vapor injection so as to increase pulp temperature to preferably between 95° C. and 110° C. and most preferably to 100° C. The equipment for ammonia removal may be a column or any other system designed for such purpose. After ammonia removal, solid-liquid separation of the pulp (C1) is carried out in either filters or thickeners and more preferably in thickeners. The solids are then filtered (C2).

Alternatively to this proposed method, the solids in the pulp may be filtered in a filtration system, without the removal of ammonia by the technique described above. In this case, a flocculating agent is used to assist in the decantation of the solids in equipment suitable for such purpose, such as a thickener, a clarifier, or other.

The use of this technique, however, may lead to higher consumption of reagent, and more specifically an acid, in the subsequent stage of the process. On the other hand, when ammonia is removed from the pulp containing the sulfidized solids by the technique described above, the filtering performance of the filtering agent chosen is enhanced.

When ammonia is removed from the pulp, some redissolution of cobalt may occur during the removal process. In this case, a sulfide precipitation agent can be added to the ammonia removal system used, during this process.

The filtered solid—cobalt sulfide (and impurities)—is subjected to oxidizing atmospheric leaching (D), which is carried out in an appropriate system of the type comprising a tank made of or lined with a material resistant to the corrosion that may occur during the process, or else, in a system comprising the use of agitators also made of or lined with corrosion-resistant material. Thus, the solid is leached with sulfuric acid at atmospheric pressure with the temperature maintained between 80° C. and 90° C., and most preferably at 85° C., for such a time as to allow recovery of a minimum of 90% of the mass of cobalt present in the solids. (D1) Oxygen is added to the system throughout the leaching period at a flow rate of between 5 and 25 L/hr, and more preferably between 10 and 20 L/hr, and most preferably 15 L/hr. The oxygen source may be either industrial oxygen of any purity or air. The pulp from this leaching stage is then filtered (D2) in a filtration system. The unleached residual solids collected in the filtration system may be recycled for recovery (D3) of residual cobalt, or may be either disposed of or used in some other part of the process. The filtrate (i.e. the solution from the filtration system) containing cobalt (and impurities) is cooled (D4) in a heat exchanger or other equipment used for such purpose, prior to removal of zinc from the solution. Owing to heating of the pulp, liquid evaporation may occur during the leaching process, which may lead to an increase in its viscosity. In such case, dispersion of the oxygen added to the pulp may be hampered, and as a consequence there may be a decrease in cobalt recovery in this process.

Thus, during this process the pulp being leached is monitored for its characteristics and, if necessary, a correction of its viscosity is applied by adding a liquid (D5), which may be water, to the leaching system. In this way, oxygen dispersion in the pulp will not be affected.

Zinc removal from the solution is required, to reduce to a minimum the zinc concentration in the cobalt round, since in the final product the concentration of this element in solution is estimated to increase 25 times.

Separation of the zinc and cobalt contained in the solution, after atmospheric leaching and filtration, is carried out by solvent extraction (E), using di(2-ethylhexyl) phosphoric acid extractant diluted in Dearomatized Hydrocarbons solvent or other equivalent solvent, in any solvent extraction system comprising the required number of extraction, scrubbing, and stripping stages, with resident time of not less than 1 minute at each of the applied stages.

In the extraction stage, the pH is controlled so as to be in the range between 1.4 and 1.8 and most preferably at 1.6, by the addition of a base (E1), more preferably sodium hydroxide. Zinc is transferred from the aqueous solution to the extractor. The process occurs in a continuous aqueous medium with an organic/aqueous ratio of between 1.00 and 2.11 and more preferably of 2.00. The aqueous continuity (organic/aqueous ratio of approximately 1:1) is achieved by means of internal recycles (E2) within each of the employed extraction stages.

The temperature of this process shall be maintained between 40° C. and 60° C. and more preferably at 50° C., by any system appropriate for such purpose. It should be noted that for an organic/aqueous ratio of 1.00 the concentration of cobalt in the organic will be minimum.

On the other hand, zinc contamination in the raffinate from the extraction process will be maximum. At the other extreme, such condition is reversed: owing to the lower zinc load in the organic, the loss of cobalt into the organic will be higher, and zinc contamination in the raffinate will be minimum.

If necessary, the raffinate (i.e. the zinc-free solution) from the extraction stage is purified of its impregnated organic content in any system appropriate for such purpose, such as coal columns.

Depending on the nickel concentration in the cobalt solution, nickel purification can be carried out in a system appropriate for such purpose, such as, for example, ion exchange columns for nickel removal (F) containing a resin capable of performing this process, and especially Dowex™ M 4195 resin. Nickel concentration in solution shall not exceed 70 mg/L.

After the purification processes described hereinabove, the cobalt solution will have been purified with respect to most impurities, but may contain a high concentration of sodium, owing to the pH adjustment in the zinc solvent extraction stage (E), where sodium hydroxide (NaOH) is used for said adjustment. On the other hand, the concentration of cobalt in this solution is still too low for effective electrowinning.

With the purpose of removing the sodium from the solution and increasing the cobalt concentration, sodium carbonate is added to the solution for the precipitation of cobalt carbonate (G). The precipitation temperature is maintained between 28° C. and 45° C. and more preferably at 35° C. The sodium carbonate is dosed so as to elevate the solution pH to between 7.0 and 9.0, more preferably to 8.0. The recovery of cobalt mass from the solution is not less than 90%.

The cobalt carbonate produced by the technique described above is then filtered (G1) in an appropriate filtration system, preferably one that includes a washing stage, so as to ensure that any and all excess sodium carbonate is washed from the produced solid.

The produced cobalt carbonate is leached (G2) in a appropriate system of the type comprising a tank made of or lined with a corrosion-resistant material, or else, in a system comprising the use of agitators also made of or lined with corrosion-resistant material. Leaching is carried out using an acid, preferably sulfuric acid, and most preferably the anolyte from cobalt electrolysis. The resulting product is the strong electrolyte, concentrated in cobalt, whose concentration of this element in solution is not less than 40 g/L, preferably between 40 and 80 g/L, and most preferably 70 g/L of cobalt, for electrolysis feed.

Next, the product from the cobalt carbonate leaching stage is filtered (H) in any appropriate filtration system. The solids recovered in the filtration process are repulped with demineralized water and are returned to the cobalt carbonate leaching system.

One cobalt electrowinning stage (I) is carried out so as to recover cobalt in the metallic from the solution.

Electrolysis is carried out in an appropriate electrowinning system in which the electrodes are insoluble plates made of lead-calcium-tin alloy. In the cells, the anodes are enclosed in membrane bags so as to prevent the migration of hydrogen ions to the cathode. In this way, the anolyte and catholyte solutions are processed separately.

Where the anolyte is used for cobalt carbonate dissolution, the cobalt carbonate is filtered in an appropriate filtration system and directed to the cobalt carbonate leaching stage. After leaching, it is passed through a heat exchange system so as to control its temperature between 55° C. and 70° C. and more preferably at 65° C., and is returned to the electrowinning feed tank, which may be a tank loaded with cobalt (strong electrolyte).

The catholyte, which is processed separately from the anolyte, is returned to the electrowinning feed system, where it is mixed with the strong electrolyte from the cobalt carbonate acid leaching. After mixing, the cobalt concentration in the electrolyte is not less than 40 g/L. The electrolyte is dosed with either a base or an acid, more preferably with caustic soda or sulfuric acid, for adjusting the pH within the range from 3.6 to 2.7. During the operation, the characteristics of the product being formed are observed, and pH adjustment is carried out accordingly. In this electrowinning feed system, barium hydroxide may be added to remove from the solution any lead that might have dissolved from the anode and contaminated the solution.

The metallic cobalt is deposited in the form of discs onto insoluble plates made of stainless steel for the time required for production of the cathodes, more preferably for 5 days. The stainless steel plate on which the cobalt is deposited may, or may not, have a mold made of specified material, such as a resin, that is resistant to the acid, so as to give the cobalt cathodes the form of discs (J).

EXAMPLE OF THE INVENTION

The following example illustrates the usefulness of the process in question. The nickel solvent extraction raffinate has the following composition mg/L:

| Ni | Co | Fe | Mg | Mn | Cu | Zn | Ca | Na | Cr | S(t) |
|----|----|----|----|----|----|----|----|----|----|------|
| 6 | 1731 | 0 | 24 | 0 | 1 | 736 | 8 | 1902 | 0 | 4454 |

After the addition of NaHS (1.5 times the stoichiometric dosage), precipitation of the cobalt sulfide occurred, and the liquor presented the following composition (mg/L):

| Ni | Co | Fe | Mg | Mn | Cu | Zn | Ca | Na | Cr | S(t) |
|----|----|----|----|----|----|----|----|----|----|------|
| 0 | 13 | 0 | 31 | 0 | 0 | 1 | 12 | 1580 | 0 | 5002 |

Precipitation efficiency was as follows:

|  | Co | Zn | Ni |
|---|---|---|---|
| Precipitation efficiency (%) | 98.9 | 99.9 | 93.2 |

The produced precipitate was subjected to a removal (stripping) stage of all the ammonia present.

The chemical composition of the produced precipitate was as follows:

| Precipitate | Co | Ni | Mn | Fe | Zn | S(total) |
|---|---|---|---|---|---|---|
| (%) | 28.00 | 0.04 | 0.01 | 0.01 | 12.36 | 33.18 |

The pulp containing the cobalt precipitate was filtered.

The cobalt sulfide was subjected to a twelve-hour oxidizing atmospheric leaching period, after which the following extraction (leaching) efficiencies were obtained:

| Dissolution | Co | Ni | Mg | Mn | Zn |
|---|---|---|---|---|---|
| (%) | 99.996 | 99.998 | 99.992 | 99.984 | 99.999 |

The test for cobalt refining, described below, includes cobalt precipitation, acid releaching, zinc solvent extraction, nickel ion exchange, and cobalt electrowinning (electrolysis).

The feed to the cobalt circuit is an aqueous solution containing cobalt,⁻ referred to as nickel raffinate. Said solution is a byproduct from the downstream part of the process.

Cobalt Sulfide Precipitation

The precipitation was carried out in 250-L tanks that were fed with the nickel raffinate with composition given in table 1, and with 1.5 times the stoichiometric amount of NaHS for Zn and Co. The operation was carried out at 50° C. for 30 minutes, and the final product obtained was a mixed precipitate of cobalt and zinc sulfides. Said residence time established for the tanks is sufficient for the precipitation of 99.7% of the cobalt, 99.4% of the zinc, and 99.9% of the nickel. Said values can be confirmed by analyzing the composition of the precipitation discharge liquor, shown in table 2

TABLE 1

Composition of the nickel raffinate:

| Batch No. | Concentration, mg/L | | | | | | | | | | | Liquor volume (L) |
|---|---|---|---|---|---|---|---|---|---|---|---|---|
|  | Ni | Co | Fe | Mg | Mn | Cu | Zn | Ca | Na | Cr | S(t) |  |
| 10 | 6 | 1758 | 0 | 26 | 0 | 2 | 734 | 10 | 34 | 0 | 4896 | 256 |

TABLE 2

Composition of the precipitation discharge liquor (CoS):

| Batch No. | Ni | Co | Fe | Mg | Mn | Cu | Zn | Ca | Na | Cr | S(t) | % Solids w/w | Liquor volume (L) |
|---|---|---|---|---|---|---|---|---|---|---|---|---|---|
| | | | | | Concentration, Mg/L | | | | | | | 0.6 | |
| 10 | 0 | 4 | 0 | 27 | 0 | 0 | 4 | 13 | 1679 | 0 | 6694 | | 256 |

The precipitate was then fed to a column counter-current to steam flow, for complete removal of free ammonia prior to the decantation and filtration steps, the temperature of the feed vapor being 100° C. During this operation, approximately 2.3% of cobalt dissolution occurred, and the amounts of ammonia in the discharge were found to be less than 0.5 ppm. The values of feed, discharge, and percent of dissolution of metals during vapor separation are listed in table 3. The products from the slurries of NaHS precipitate and NaHS/$NH_3$ separate were pumped to the decanters and maintained at approximately 50° C. After flocculation, which was carried out with the addition of 350 g/t of Magnafloc 919, the solids were filtered, washed with demineralized water, and kept as feed to the cobalt sulfide leaching.

TABLE 3

Dissolution of metals during the complete steam separation of the NaHS precipitation product:

| Current | Ni mg/L | Co mg/L | Fe mg/L | Mg mg/L | Mn mg/L | Cu mg/L | Zn mg/L | Ca mg/L | $NH_3$ mg/L |
|---|---|---|---|---|---|---|---|---|---|
| Average feed | 0.4 | 7.5 | 0.6 | 25 | 0.1 | 0.1 | 1.0 | 12 | 10.1 |
| Average discharge | 0.7 | 44 | 1.2 | 51 | 0.5 | 0.2 | 0.7 | 15 | 0.3 |
| % dissolution | 11.2 | 2.3 | 54.2 | 97.1 | 53.4 | 25.3 | −0.1 | 53.0 | — |

Cobalt Sulfide Leaching

The oxidizing leaching was carried out in a 60-L polypropylene vessel, with direct injection of steam to prevent corrosion. The temperature was maintained at 85° C. by means of a heated water jacket.

The optimal leaching conditions for 36 L of pulp volume at 85° C. were as follows: oxygen rate 10 L/min, percent of solids in the cobalt sulfide pulp 10% (w/w), addition of 303 kg/t of 98% sulfuric acid, pH controlled at 1.5, and residence time 20 hours.

The leaching rate for the cobalt sulfide precipitate was low, requiring at least 12 hours for 99% of dissolution of the cobalt to be achieved. In contrast, zinc dissolution was faster (3 to 4 hours).

The leach product was filtered, then the pie was subjected to releaching with sulfuric acid for higher cobalt recovery. The relation between the composition of the CoS feed and that of the leaching residue is given in table 4.

TABLE 4

Compositions of the feed and of the residue from cobalt sulfide leaching:

| | | | | | | |
|---|---|---|---|---|---|---|
| Feed to CoS leaching No. 3 | 28 | 0.04 | 0.01 | 0.01 | 12.36 | 33.18 |
| Residue from leaching No. 3 | 1.31 | 0.00 | 0.000 | 0.00 | 0.03 | 89.80 |

Zn and Co extractions are greater than 99%. Table 5:

TABLE 5

Composition of the leach liquor:

| Element | g/L |
|---|---|
| Co | 26.71 |
| Zn | 12.25 |
| Fe | 0.014 |
| Cr | 0.004 |

The solution containing cobalt was treated in a solvent extraction stage so as to separate cobalt from zinc.

The solvent extraction circuit comprised 4 extraction stages, scrubbing stages, and 3 re-extraction (stripping) stages. The temperature in the 4 extraction stages was maintained at 50° C.

Zinc Solvent Extraction

The zinc solvent extraction circuit (liquid-liquid separation) comprised 4 extraction stages, 2 scrubbing stages, and 3 stripping stages.

Extraction

Zinc solvent extraction was carried out in 4 extraction steps, the feeds to this stage being the solution from the cobalt sulfide oxidizing leaching and the organic component. The temperature was maintained at 50° C., and the organic/aqueous ratio in the separation circuit was maintained at approximately 2:1 so as to minimize zinc contamination in the extraction raffinate. The organic extractant utilized was $D_2EHPA$, diluted to 30% v/v using Escaid 110. The conditions and levels of Zn and Co extraction are listed in table 6, for the process conditions as defined for this stage.

TABLE 6

Zn and Co extraction profiles

| Extraction profile | Organic/ aqueous advance | PLS pH | E1 extraction pH | E2 extraction pH | E3 extraction pH | E4 extraction pH | E1 Zn extraction % | E2 Zn extraction % | E3 Zn extraction % | E4 Zn extraction % | E1 Co extraction % | E2 Co extraction % | E3 Co extraction % | E4 Co extraction % |
|---|---|---|---|---|---|---|---|---|---|---|---|---|---|---|
| Profile 1 | 2.05 | 2.18 | 1.42 | 1.60 | 1.60 | 1.62 | 94.45 | 5.30 | 0.24 | 0.00 | −0.90 | −0.42 | 0.69 | 1.23 |
| Profile 2 | 2.11 | 2.21 | 1.60 | 1.66 | 1.64 | 1.65 | 94.81 | 5.03 | 0.15 | 0.00 | −0.95 | 0.20 | 0.08 | 1.34 |

The average compositions of zinc in the aqueous phase and cobalt in the organic phase along the extraction steps are shown in tables 7 and 8 respectively.

TABLE 7

Average composition of the zinc raffinate, mg/L

| Zinc extraction: aqueous pHase composition (mg/L) | Profile 1 | Profile 2 |
|---|---|---|
| PLS | 12500 | 12700 |
| E1 | 694 | 659 |
| E2 | 32 | 20 |
| E3 | 1.0 | 1.5 |
| E4 (raffinate) | 1.5 | 1.0 |

TABLE 8

Average cobalt concentration in the organic pHase, mg/L

| Cobalt extraction: organic pHase composition (mg/L) | Profile 1 | Profile 2 |
|---|---|---|
| Organic waste | 1 | 1 |
| E4 | 166 | 179 |
| E3 | 258 | 190 |
| E2 | 202 | 216 |
| Organic load | 82 | 90 |

Scrubbing

The organic load was passed through two scrubbing steps, with pH maintained at 1.4 and 1.3 respectively, and with addition of acid so as to prevent cobalt advance in the zinc stripping stage and also to recover cobalt, which can be recirculated to the cobalt sulfide leaching stage. The compositions of the aqueous and organic phases in the two steps, in mg/L, are shown in table 9.

TABLE 9

Aqueous and organic compositions of the depurate, in mg/L
Composition, mg/L

| | Ni | Co | Fe | Mg | Mn | Cu | Zn | Ca | Na | PH |
|---|---|---|---|---|---|---|---|---|---|---|
| Stage 1 Depuration product | 19 | 2174 | 1 | 11 | 6 | 2 | 565 | 15 | 4127 | 1.44 |
| Stage 2 Depuration product | 56 | 3614 | 1 | 17 | 38 | 1 | 2281 | 62 | 4208 | 1.57 |
| Stage 1 Organic depuration | 1 | 24 | 210 | 4 | 1 | 0 | 5640 | 21 | 10 | — |
| Stage 2 Organic depuration | 1 | 8 | 213 | 4 | 2 | 0 | 13339 | 21 | 10 | — |

Zinc Stripping

The circuit for removal of the zinc contained in the organic phase comprises three steps. A feed of $H_2SO_4$ of 200 g/L was utilized Sulfuric acid consumption was equivalent to 1,246 kg/t of Zn. The compositions of the acid solution before and after the separation, as well as the compositions of the organic phase after the separation, are shown in tables 10, 11, and 12 respectively.

TABLE 10

Composition of the separation feed, in mg/L

| Separation feed aqueous | Concentration, mg/L | | | | | | | | | | Free acid g/L |
|---|---|---|---|---|---|---|---|---|---|---|---|
| | NI | Co | Fe | Mg | Mn | Cu | Zn | Ca | Na | S(t) | |
| Average/Total (Oxidizing leaching No. 3) | 1 | 1 | 0.7 | 72 | 0.2 | 0.2 | 1 | 78 | 692 | 61846 | 204 |

TABLE 11

Composition of the separation product, mg/L

| Separation feed aqueous | Concentration, mg/L | | | | | | | | | Free acid g/L |
|---|---|---|---|---|---|---|---|---|---|---|
| | NI | Co | Fe | Mg | Mn | Cu | Zn | Ca | Na | |
| Average/Total (Oxidizing leaching No. 3) | 1 | 43 | 8.7 | 60 | 2.5 | 0.2 | 13820 | 82 | 582 | 193 |

TABLE 12

Composition of the organic pHase of the separation, mg/L

| Separation feed aqueous | Concentration, mg/L | | | | | | | | |
|---|---|---|---|---|---|---|---|---|---|
| | NI | Co | Fe | Mg | Mn | Cu | Zn | Ca | Na |
| Average/Total (Oxidizing leaching No. 3) | 2 | 1.5 | 203 | 4.0 | 0.4 | 0 | 3 | 18 | 10.0 |

After solvent extraction, the solution containing cobalt (i.e. the raffinate) was purified of nickel by means of ion exchange.

Removal of Nickel by Ion Exchange

Ion exchange was used to remove any nickel impurity from the cobalt liquor prior to electrowinning. The circuit comprised five columns, four of which for extraction, and one for elution.

The initial feed to the nickel ion exchange circuit was a liquor with a nickel content of 85 mg/L. During loading, the breakthrough occurred in column 1 within the first two hours, and after 24 hours of operation, in which the concentration of the discharge liquor from the fourth extraction column was of 0.5 mg/L of nickel, the effluent from column 1 contained approximately 40 mg/L of nickel.

Cobalt Carbonate Precipitation and Leaching

The feeds for the precipitation of cobalt carbonate are either the discharge liquor from the nickel ion exchange (when utilized) or the zinc solvent extraction raffinate after it has passed through coal columns for removal of impregnated organic and anhydrous $Na_2CO_3$. Precipitation occurs at 35° C. at pH 8.0 for 30 minutes. The proportion of sodium carbonate added was 1.64 mols per cobalt mol, or 2.987 kg/kg of cobalt. Approximately 99% of the cobalt was precipitated. The composition of the cobalt precipitate $CoCO_3$ ($H_2SO_4$ leaching feed) is specified in table 13.

TABLE 13

Composition of the cobalt precipitate $CoCO_3$: Composition CoCos

| Co | NI | Na | Mg | Mn | Zn | Fe | Cu | S(t) | Ca |
|---|---|---|---|---|---|---|---|---|---|
| 47.8 | 0.02 | 2.4 | 0.00 | 0.00 | 0.00 | 0.02 | 0.00 | 0.79 | 0.02 |

After being filtered, the precipitate is leached with sulfuric acid, at ambient temperature (25° C.) and pH 3.0, for 30 minutes, forming a solution with 70 g/L of Co. The composition of the leaching discharge liquor is given in table 14.

TABLE 14

Composition of the cobalt carbonate liquor from acid leaching, in mg/L
Concentrations of the cobalt carbonate liquor from acid leaching, in mg/L

| Co | Ni | Na | Mg | Mn | Zn | Fe | Cr | Ca | pH |
|---|---|---|---|---|---|---|---|---|---|
| 75599 | 11.1 | 21453 | 10.6 | 4.9 | 3.9 | 0 | 10.5 | 29.5 | 3 |

Cobalt Electrowinning

The concentrated cobalt solution was fed to an electrolytic cell at a current density of 350 A/m². The feed rate was 2 mL/min. The pH was adjusted to 3.0 with the addition of 2 M of sodium hydroxide solution, and the temperature was maintained at 60° C. The residence time in this operation was five days, at the end of which a Grade 1 cobalt cathode with Co purity of up to 99.96% and 5 mg/kg of Ni was produced. A comparison between the composition of the cathode produced in the test described above and the specifications defined for GRADE 1 cobalt cathode is given in table 15. These values show that the impurities in the produced cathode are within the limits of GRADE 1 specification.

TABLE 15

Composition of the 5-day cobalt cathode

| Identification | Mass kg | % Co | Composition ppm | | | | | | | | | | | | |
|---|---|---|---|---|---|---|---|---|---|---|---|---|---|---|---|
| | | | Cu | Ni | Fe | Zn | Mn | Mg | Ca | Al | S | As | Na | Cr | Si |
| 5-day cathode | 0.293 | 99.961 | 4 | 5 | 20 | 29 | 1 | 2 | 10 | 8 | 25 | 20 | 14 | 11 | 10 |
| Grade 1 specif | | | 40 | 3500 | 100 | 55 | 10 | 10 | — | 50 | 40 | 10 | 5 | 6 | 25 |

Although a preferred methodological sequence has been described and illustrated, it should be noted that modifications are possible and achievable without departing the scope of the present invention.

The invention claimed is:
1. A method for production of metallic cobalt from a nickel solvent raffinate comprising the steps of:
 (A) adding a sulfide precipitation agent to the nickel solvent extraction raffinate thereby producing a sulfidized pulp at least comprising cobalt sulfide;
 (B) removing ammonia from the sulfidized pulp;
 (C) leaching the sulfidized pulp with a leaching solution comprising sulfuric acid to produce a cobalt enriched leaching solution;

(D) removing zinc from the cobalt enriched leaching solution by solvent extraction with di-(2-ethylhexyl)phosphoric acid in a solvent wherein the cobalt enriched leaching solution has a pH between 1.4 and 1.8;

(E) adding a carbonate precipitation agent to the cobalt enriched leaching solution to precipitate cobalt carbonate;

(F) leaching the precipitated cobalt carbonate with an acid to produce an electrolyte solution; and (G) extracting metallic cobalt from the electrolyte solution by electrowinning.

2. The method of claim 1, wherein an ion exchange system is used to remove any residual nickel from the cobalt enriched leaching solution before the carbonate precipitation agent is added to the solution.

3. The method of claim 2, wherein the ion exchange system for nickel removal contains a resin capable of performing this process with nickel concentration in solution no greater than 70 mg/L.

4. The method of claim 1, wherein a sulfide precipitation agent is added to precipitate any cobalt dissolved when ammonia is removed from the sulfidized pulp.

5. The method of claim 1, wherein the carbonate precipitation agent is sodium carbonate.

6. The method of claim 1, wherein the sulfide precipitation agent is sodium hydrosulfide (NaHS).

7. The method of claim 6, wherein the amount of sodium hydrosulfide added to the nickel solvent extraction raffinate exceeds 1.5 times the stoichiometric amount of cobalt and zinc present in the nickel solvent extraction raffinate.

8. The method of claim 1, wherein a precipitation temperature during step A is maintained between 40° C. and less than 50° C.

9. The method of claim 8, wherein a precipitation temperature during step A is maintained at 45° C.

10. The method of claim 1 wherein all the ammonia present in the sulfidized pulp (solids and liquid) is removed by steam injection, increasing pulp temperature to preferably between 95° C. and 110° C.

11. The method of claim 10, wherein ammonia removal is carried out in a column or other system designed for such purpose, with subsequent solid-liquid separation of the pulp performed by using either filters or thickeners and then filtering the solids.

12. The method of claim 11, wherein filtration of the solids in the pulp in a filtration system occurs with the removal of ammonia and a sulfide precipitation agent is added to form a sulfidized pulp.

13. The method of claim 1, wherein the sulfidized pulp is filtered and subjected to oxidizing atmospheric leaching in step C, in a system comprising a tank made of or lined with a corrosion-resistant material.

14. The method of claim 13, wherein the sulfidized pulp subjected to leaching with sulfuric acid under atmospheric pressure has its temperature maintained between 80° C. and 90° C., for such a time as to allow recovery of a minimum of 90% of the mass of cobalt present in the solids, and adding oxygen to the system throughout the leaching period at a flow rate of between 5 and 25 L/hr.

15. The method of claim 13 wherein pulp from step C is filtered, and unleached residual solids collected in a filtration system are recycled for recovery of residual cobalt, or may be either disposed of, or used in some other part of the process.

16. The method of claim 13, during step C the pulp being leached is monitored for its characteristics and a correction of its viscosity may be applied by adding a liquid.

17. The method of claim 1, wherein the sulfidized pulp is filtered and subjected to oxidizing atmospheric leaching in step C, in a system comprising agitators made of or lined with corrosion-resistant material.

18. The method of claim 1, whereby in step D the pH is maintained within the range between 1.4 and 1.8 by the addition of a base with zinc being transferred from the aqueous solution to an extractor.

19. The method of claim 1, wherein the temperature of step D is maintained between 40° C. and 60° C.

20. The method of claim 1, whereby in step D, the raffinate is purified of its impregnated organic content.

21. The method of claim 1, wherein during the precipitation of cobalt carbonate, the precipitation temperature is maintained between 28° C. and 45° C. and the carbonate precipitation agent is dosed so as to elevate the solution pH to between 7.0 and 9.0.

22. The method of claim 21, wherein the carbonate precipitation agent is sodium carbonate.

23. The method of claim 1, wherein the cobalt carbonate is filtered in a filtration system.

24. The method of claim 1, wherein the produced cobalt carbonate is subjected to leaching in step F in an appropriate system of the type comprising a tank made of or lined with a corrosion-resistant material.

25. The method of claim 1, wherein the produced cobalt carbonate is subjected to leaching in step F in an appropriate system of the type comprising agitators made of or lined with corrosion-resistant material.

26. The method of claim 1, wherein leaching in step F is carried out using an acid, with the resulting product being a strong electrolyte, whose cobalt concentration is not less than 40 g/L.

27. The method of claim 1 wherein the ammonia present in the sulfidized pulp (solids and liquid) is removed by steam injection.

28. The method of claim 27, wherein the sulfidized pulp has a temperature between 95° C. and 110° C. during treatment by steam injection.

29. The method of claim 1, wherein the electrowinning of cobalt is performed on stainless steel cathodes.

30. The method of claim 1, wherein the leaching solution of step C has a pH of about 1.5.

31. A method for production of metallic cobalt from a nickel solvent raffinate comprising the steps of:

(A) adding a sulfide precipitation agent to the nickel solvent extraction raffinate thereby producing a sulfidized pulp at least comprising cobalt sulfide;

(B) filtering the sulfidized pulp to separate the solid pulp from any aqueous solution;

(C) leaching the sulfidized pulp with a leaching solution comprising sulfuric acid and having a pH of about 1.5 to produce a cobalt enriched leaching solution;

(D) removing zinc from the cobalt enriched leaching solution by solvent extraction with di-(2-ethylhexyl)phosphoric acid in a solvent wherein the cobalt enriched leaching solution has a pH between 1.4 and 1.8;

(E) adding a carbonate precipitation agent to the cobalt enriched leaching solution to precipitate cobalt carbonate;

(F) leaching the precipitated cobalt carbonate with an acid to produce an electrolyte solution; and (G) extracting metallic cobalt from the electrolyte solution by electrowinning.

* * * * *